United States Patent
Jamison et al.

(10) Patent No.: US 12,435,612 B2
(45) Date of Patent: Oct. 7, 2025

(54) EVENT DETECTION USING HYDRAULIC SIMULATIONS

(71) Applicant: Halliburton Energy Services, Inc., Houston, TX (US)

(72) Inventors: Dale E. Jamison, Houston, TX (US); Mateusz Michal Dyngosz, Houston, TX (US); Aidan Porter, Aberdeen (GB)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 17/984,002

(22) Filed: Nov. 9, 2022

(65) Prior Publication Data
US 2024/0151132 A1    May 9, 2024

(51) Int. Cl.
*E21B 44/00* (2006.01)
*E21B 47/00* (2012.01)
*E21B 49/00* (2006.01)
*G01V 20/00* (2024.01)

(52) U.S. Cl.
CPC .............. *E21B 44/00* (2013.01); *E21B 47/00* (2013.01); *E21B 49/00* (2013.01); *G01V 20/00* (2024.01); *E21B 2200/20* (2020.05); *E21B 2200/22* (2020.05)

(58) Field of Classification Search
CPC .......... E21B 44/00; E21B 47/00; E21B 49/00; E21B 2200/20; E21B 2200/22; G01V 99/005
See application file for complete search history.

(56) References Cited

U.S. PATENT DOCUMENTS

| | | |
|---|---|---|
| 5,952,569 A | 9/1999 | Jervis et al. |
| 2004/0124012 A1 | 7/2004 | Dunlop et al. |
| 2008/0289877 A1* | 11/2008 | Nikolakis-Mouchas ............ E21B 44/00 702/9 |
| 2011/0024189 A1 | 2/2011 | Saeed et al. |
| 2013/0341093 A1* | 12/2013 | Jardine ............ E21B 7/00 703/2 |
| 2014/0110167 A1 | 4/2014 | Goebel et al. |
| 2020/0302353 A1* | 9/2020 | Tang ............ G06Q 10/0635 |
| 2020/0355059 A1* | 11/2020 | Zhang ............ E21B 41/00 |
| 2021/0180418 A1* | 6/2021 | Sun ............ E21B 47/10 |
| 2021/0293130 A1 | 9/2021 | Revheim et al. |

* cited by examiner

*Primary Examiner* — Nicole Coy
*Assistant Examiner* — Nicholas D Wlodarski
(74) *Attorney, Agent, or Firm* — Michael Jenney; Parker Justiss, P. C.

(57) ABSTRACT

Determining the likelihood of an event occurring during a drilling operation can utilize various input parameters collected from one or more sensors located downhole or at a surface location of the borehole undergoing the drilling operation. The collected input parameters can be weighted according to user parameters and then calculated over time to determine a trend in the input parameters. The trend can be analyzed against one or more probability models, such as using a machine learning process, to determine a potential for the event to occur and an estimated time interval over which the event may occur. The results of this analysis can be used by users or drilling systems to implement corrective actions to reduce or avoid the potential for the event occurring.

20 Claims, 7 Drawing Sheets

| Event | Category | % Category Value | Parameter Name | % Parameter Value |
|---|---|---|---|---|
| Hole Cleaning | Drilling Parameters | 40 % | SPP | 22.5 |
| | | | PWD | 22.5 |
| | | | TRQ | 15.0 |
| | | | FLOW | 12.5 |
| | | | RPM | 17.5 |
| | | | ROP | 10.0 |
| | | | | 100 |
| | Hydraulic data vs Drilling Parameters | 60 % | SPP | 17.5 |
| | | | PWD | 25.0 |
| | | | FLOW | 17.5 |
| | | | RPM | 20.0 |
| | | | ROP | 20.0 |
| | | | | 100 |

EVENT DETECTION USING HYDRAULIC SIMULATIONS

TECHNICAL FIELD

This application is directed, in general, to modeling drilling conditions and, more specifically, to predicting the onset of negative drilling operation events.

BACKGROUND

When developing a borehole, such as performing drilling operations, data can be collected from various sensors located downhole or at the surface. The data can represent factors or parameters relating to the borehole, drilling equipment, or subterranean formation. These factors can be used, for example, to determine a potential for an operational event. It would be beneficial to identify the potential for an event so that it can be addressed before the event becomes critical.

SUMMARY

In one aspect, a method is disclosed. In one embodiment, the method includes: (1) receiving user parameters and input parameters at a processor, wherein the input parameters are received from one or more sensors located at a borehole undergoing a drilling operation, (2) calculating a weighted probability for each event parameter of an event as indicated in the input parameters, where the weighted probability includes a trend of the event parameter over a time interval, and a weighting for the weighted probability is specified in the user parameters, and (3) generating results, using the processor, by applying an event probability model to the weighted probability and the trend wherein the results determine a potential for the event to occur and an estimated time period for the event to occur.

In a second aspect, a system is disclosed. In one embodiment, the system includes: (1) a data receiver, capable to receive input parameters and user parameters, wherein the input parameters are received from one or more downhole sensors located downhole a borehole undergoing a drilling operation or one or more surface sensors located proximate the borehole at a surface of the borehole, and (2) one or more processors, capable to communicate with the data receiver, and analyze the input parameters using the user parameters to generate results, wherein the input parameters are used to generate a weighted potential for one or more events to occur, and an event probability model is applied to determine a likelihood of the one or more events to occur within a specified time interval for the results.

In a third aspect, a computer program product having a series of operating instructions stored on a non-transitory computer-readable medium that directs a data processing apparatus when executed thereby to perform operations to analyze input parameters from one or more sensors of a borehole undergoing a drilling operation is disclosed. In one embodiment, the operations include: (1) receiving user parameters and the input parameters, wherein the input parameters are received from the one or more sensors, (2) calculating a weighted probability for each event parameter of an event as indicated in the input parameters, where the weighted probability includes a trend of the event parameter over a time interval, and a weighting for the weighted probability is specified in the user parameters, and (3) generating results by applying an event probability model to the weighted probability and the trend, wherein the results determine a potential for the event to occur and an estimated time period for the event to occur.

BRIEF DESCRIPTION

Reference is now made to the following descriptions taken in conjunction with the accompanying drawings, in which.

DETAILED DESCRIPTION

Developing a borehole, such as for scientific or hydrocarbon production purposes, can utilize data collected during operations, such as drilling operations. Other operations can be measuring while drilling (MWD), logging while drilling (LWD), seismic while drilling (SWD), and other types of borehole operations. Various types of sensors and tools can be utilized to collect the data, such as magnetic resonance sensors, resistivity sensors, acoustic sensors, nuclear sensors, temperature sensors, pressure sensors, seismic sensors, and other types of sensors. In some aspects, the sensors can be located downhole, such as part of a drilling assembly or bottom hole assembly (BHA). In some aspects, the sensors can be located at the surface, such as part of the borehole rig, cuttings analysis, or other surface sensors. In some aspects, the sensors can be located downhole, uphole, at the surface, or various combinations thereof.

The data collected can be analyzed to determine the potential for various borehole related events. The potential events can then be analyzed, and for the events that need to be addressed, corrective actions can be taken, such as adjusting drilling operations, adjusting drilling fluid composition, or adjusting other drilling parameters. The potential events analysis can be utilized by various borehole systems.

This disclosure presents methods and processes to use real-time and near real-time data modeling of various sensor data to predict the onset of problematic drilling conditions and to project the timing and depths at which the detected event could impact drilling operations. The data modeling can utilize a combination of data science, real-time or near real-time data collection, or hydraulic simulations. Numerical methods can then be applied to determine an estimated time interval for an occurrence of the potential event.

Various drilling events can be modeled using the disclosed processes, along with a potential parameter indicating a likelihood of the event occurring and the depth or location of the event. For example, events that can be predicted can include hole cleaning, lost circulation, ballooning, bit balling, borehole fluid influx, borehole collapse (caving or shear), stuck pipe, bit wear, BHA vibration, excessive torque and drag, barite sag, excessive drill solids build-up, undesirable fluid changes, plugged bit nozzle, drill string or surface equipment washout, or other drill operation events.

In some aspects, early detection of an event can provide time to modify the drilling parameters of the drilling operation plan to avoid or minimize the effects of the event. For example, the drilling parameters can be a stand pipe pressure parameter, a pressure while drilling parameter, a drill string torque parameter, a flow rate parameter, a rotations per minute parameter, a rate of penetration parameter, a tripping speed parameter, a pump startup rate parameter, or other drilling parameters.

In some aspects, early detection of an event can provide time to modify the well characteristics to avoid or minimize the effects of the event. For example, the well characteristics can be an inclination parameter, a casing point parameter, a measured depth versus true vertical depth parameter, or other well characteristic parameters.

In some aspects, early detection of an event can provide time to modify the operational timings to avoid or minimize the effects of the event. For example, the operational timings can be a connection timing parameter, a circulation timing parameter, a fluid treatment rate and timing parameter, a slide and rotary drilling timing parameter, or other operational timing parameters.

In some aspects, early detection of an event can provide time to modify the drilling fluid parameters to avoid or minimize the effects of the event. For example, the drilling fluid parameters can be a mud weight parameter, a mud rheology parameter (such as viscosity, gels, or viscoelasticity), a mud chemistry parameter (such as water phase salinity, an oil-water ratio, an average specific gravity, a centrifuge failure, a shaker screen failure), a mud component or depletion rate (such as lost circulation materials, an emulsifier content, a clay inhibitor, a lubricant), a particle size distribution parameter, or other drilling fluid parameters.

In some aspects, early detection of an event can provide time to modify the solid control equipment operational parameters to avoid or minimize the effects of the event. For example, the solid control equipment operational parameters can be a shale shaker screen selection parameter, a shale shaker parameter, a de-silter and a desander parameter, a centrifuge parameter, a sand trap parameter, a surface pit parameter, a cuttings auger parameter, a cutting transfer parameter, a cuttings skip parameter, a swarf removal parameter, a dewatering parameter, or other solid control equipment operational parameters.

In some aspects, early event detection of an event can be combined with a rate of penetration optimization algorithm to enhance the drilling automation to avoid issues utilizing the current progression of the parameters and future prediction ahead of time. The performance in the boreholes with narrow margins of the parameters (such as narrow mud window or pressure sensitive formations) can be improved through the early detection of the events.

Figure 1:
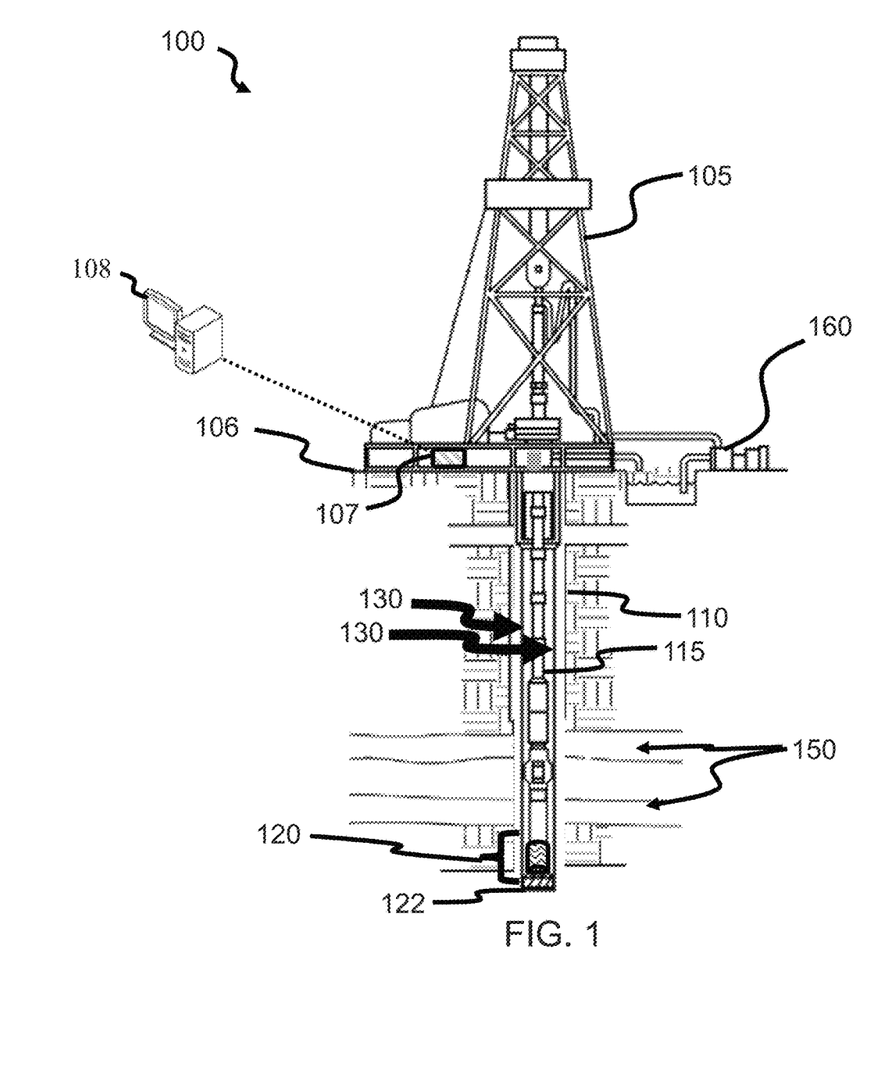
FIG. 1 is an illustration of a diagram of an example drilling system.

Turning now to the figures, FIG. 1 is an illustration of a diagram of an example drilling system 100, for example, a LWD system, a MWD system, a SWD system, a telemetry while drilling (TWD) system, injection well system, extraction well system, and other borehole systems. Drilling system 100 includes a derrick 105, a well site controller 107, and a computing system 108. Well site controller 107 includes a processor and a memory and is configured to direct operation of drilling system 100. Derrick 105 is located at a surface 106.

Extending below derrick 105 is a borehole 110 with downhole tools 120 at the end of a drill string 115. Downhole tools 120 can include various downhole tools, such as one or more sensors of various types, a formation tester, or a BHA. At the bottom of downhole tools 120 is a drilling bit 122. Other components of downhole tools 120 can be present, such as a local power supply (e.g., generators, batteries, or capacitors), telemetry systems, sensors, transceivers, and control systems. Borehole 110 is surrounded by subterranean formation 150. Surface sensors can be part of derrick 105, can monitor the return flow line from downhole the borehole, such as return flow analyzer 160 (e.g., a shaker, a cuttings analyzer, or a fluid analyzer), or other types of sensors located at the surface.

Well site controller 107 or computing system 108 (e.g., surface controllers) which can be communicatively coupled to well site controller 107, can be utilized to communicate with downhole tools 120 (e.g., downhole controllers), such as sending and receiving acoustic data, telemetry, data, instructions, subterranean formation measurements, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein.

Well site operators, engineers, and other personnel can send and receive data, instructions, measurements, and other information by various conventional means, now known or later developed, with computing system 108 or well site controller 107. Well site controller 107 or computing system 108 can communicate with downhole tools 120 using conventional means, now known or later developed, to direct operations of downhole tools 120.

Casing 130 can act as barrier between subterranean formation 150 and the fluids and material internal to borehole 110, as well as drill string 115. Sensors located with downhole tools 120, along drill string 115, at surface 106, or a combination of sensors can be used to collect various parameters that can be used as input parameters into an event detection analyzer, such as event detection analyzer system 600 of FIG. 6 or event detection analyzer controller 700 of FIG. 7. The input parameters can be used to generate one or more event predictions (e.g., potentialities) that can be communicated along with a confidence parameter or a likelihood parameter that the potential event will occur, and an estimated time interval for when the event may occur.

In some aspects, the event detection analyzer can communicate the collected data or the analysis to another system, such as computer system 108 or well site controller 107 where the input parameters can be filtered and analyzed. In some aspects, computing system 108 can be the event detection analyzer and can receive the input parameters. In some aspects, well site controller 107 can be the event detection analyzer and can receive the input parameters. In some aspects, the event detection analyzer can be partially included with well site controller 107 and partially located with computing system 108. In some aspects, the event detection analyzer can be located in another system, for example, a data center, a lab, a corporate office, or another location. In some aspects, the event detection analyzer can be located with downhole tools 120 and the results of the analysis communicated to a downhole or surface system.

Figure 2:
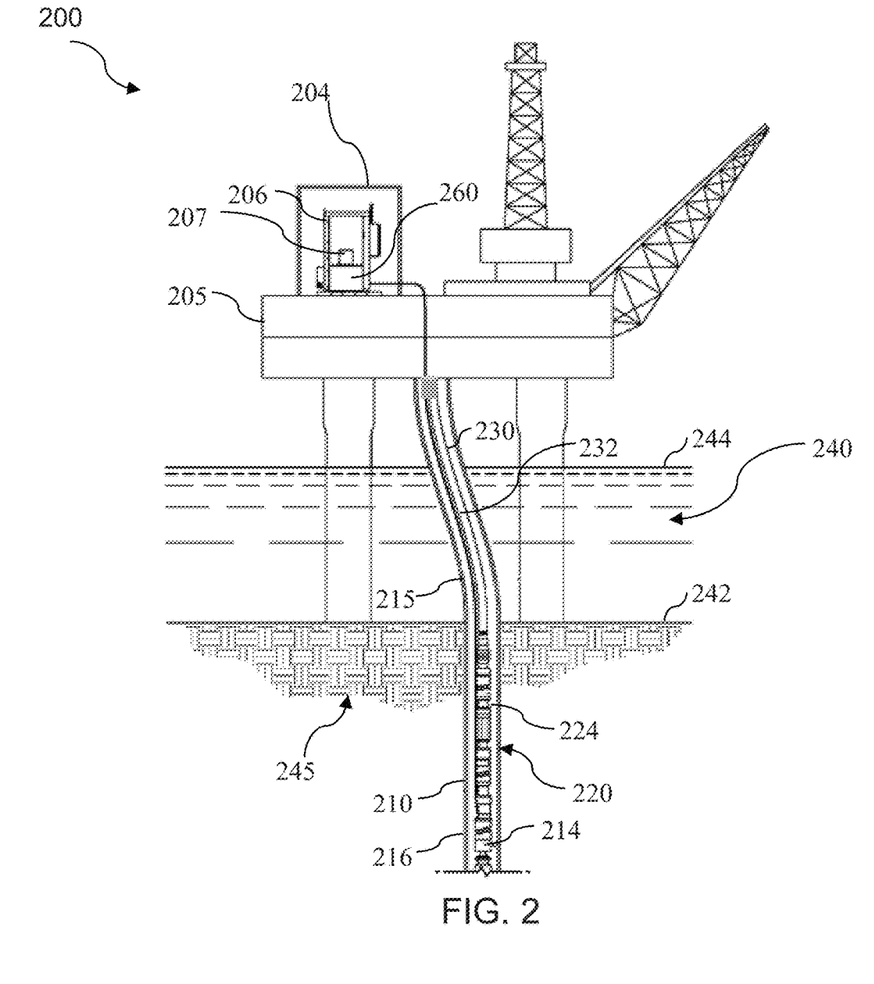
FIG. 2 is an illustration of a diagram of an example offshore system.

FIG. 2 is an illustration of a diagram of an example offshore system 200 with an electric submersible pump (ESP) assembly 220. ESP assembly 220 is placed downhole in a borehole 210 below a body of water 240, such as an ocean or sea. Borehole 210, protected by casing, screens, or other structures, is surrounded by subterranean formation 245. ESP assembly 220 can be used for onshore operations. ESP assembly 220 includes a well controller 207 (for example, to act as a speed and communications controller of ESP assembly 220), an ESP motor 214, and an ESP pump 224.

Well controller 207 is placed in a cabinet 206 inside a control room 204 on an offshore platform 205, such as an oil rig, above water surface 244. Well controller 207 is configured to adjust the operations of ESP motor 214 to improve well productivity. In the illustrated aspect, ESP motor 214 is a two-pole, three-phase squirrel cage induction motor that operates to turn ESP pump 224. ESP motor 214 is located near the bottom of ESP assembly 220, just above downhole sensors within borehole 210. A power/communication cable 230 extends from well controller 207 to ESP motor 214. A fluid pipe 232 fluidly couples equipment located on offshore platform 205 and ESP pump 224.

In some aspects, ESP pump 224 can be a horizontal surface pump, a progressive cavity pump, a subsurface compressor system, or an electric submersible progressive cavity pump. A motor seal section and intake section may extend between ESP motor 214 and ESP pump 224. A riser 215 separates ESP assembly 220 from water 240 until sub-surface 242 is encountered, and a casing 216 can separate borehole 210 from subterranean formation 245 at and below sub-surface 242. Perforations in casing 216 can allow the fluid of interest from subterranean formation 245 to enter borehole 210.

A surface sensor system 260 can be used to analyze return flows, such as the fluid or the solid components, retrieved from downhole. Other sensors can be located downhole, such as part of or along ESP assembly 220. The data collected from the various sensors can be used as input parameters to an event detection analyzer producing results. The results can be communicated to one or more other systems, such as well controller 207. In some aspects, the input parameters can be transmitted to another system, such as well controller 207, where well controller 207 can be the event detection analyzer or event detection processor, or can be an event detection analyzer controller. In some aspects, the event detection analyzer or event detection processor, or the event detection analyzer controller, can be partially in well controller 207, partially in another computing system, or various combinations thereof. The results of the event detection analyzer, event detection processor, or event detection analyzer controller can be used to generate one or more events with a potentiality or likelihood parameter, which can be used as inputs into the current or future drilling operation plans, such as directing operation of the drill bit, be used to model subterranean formation 245, or to provide an alert that correction should be taken.

FIG. 1 depicts onshore operations. Those skilled in the art will understand that the disclosure is equally well suited for use in offshore operations, such as shown in FIG. 2. FIGS. 1-2 depict specific borehole configurations, those skilled in the art will understand that the disclosure is equally well suited for use in boreholes having other orientations including vertical boreholes, horizontal boreholes, slanted boreholes, multilateral boreholes, and other borehole types.

Figure 3:
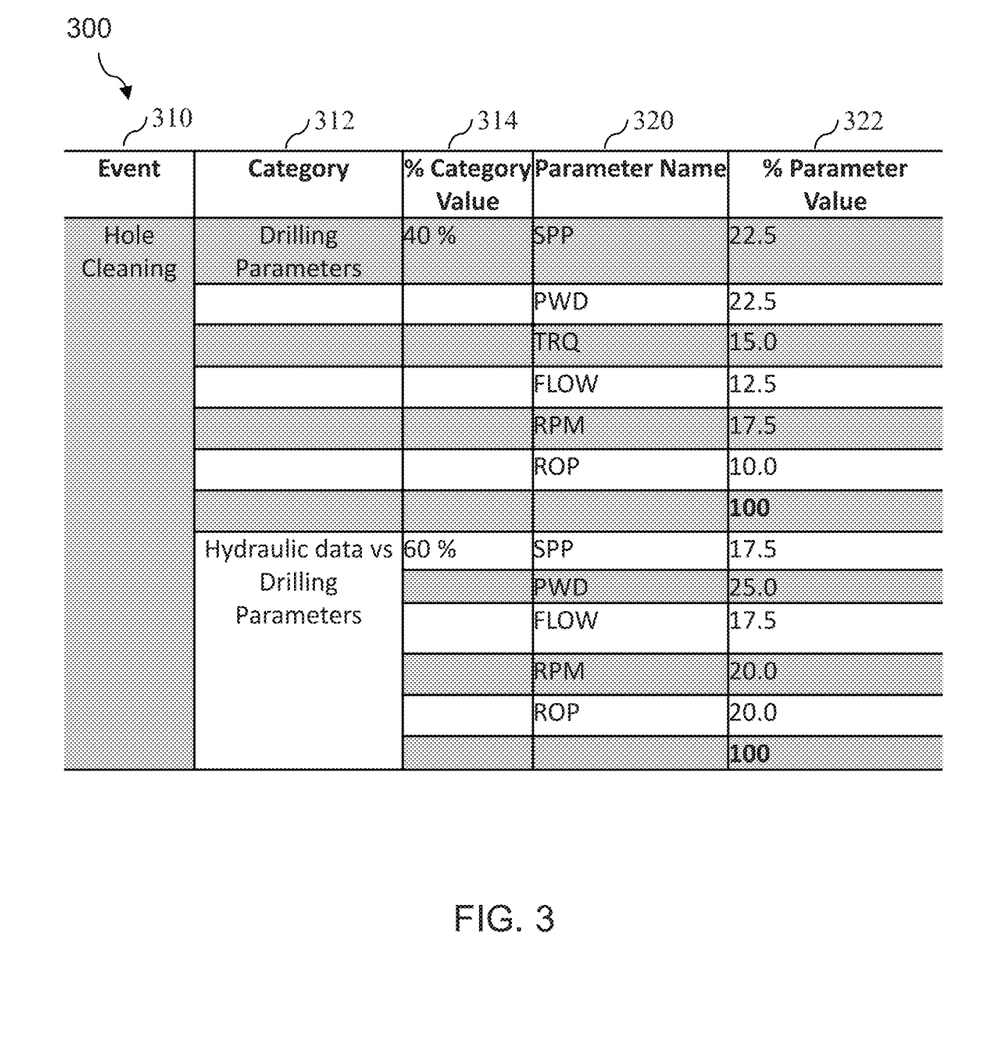
FIG. 3 is an illustration of a table of an example event detection analysis.

FIG. 3 is an illustration of a table of an example event detection analysis 300. Event detection analysis 300 demonstrates the analysis applied to input parameters for a hole cleaning event. Real-time or near real-time event parameters for cuttings transport event detection (leading to a hole cleaning analysis) can include, stand pipe pressure (SPP), pressure while drilling (PWD), drill string torque (TRQ), fluid flow rate (FLOW), drill string rotations per minute (RPM), rate of penetration (ROP). Data models (e.g., event probability models) for these drilling parameters can provide an indication of a potential cuttings transport event. The maximum for the combined weighting of this category is 100 percent (%). Data models can provide comparisons and weightings of a real-time or near real-time hydraulics model utilizing input parameters, such as shown in event detection analysis 300. The maximum weighting is 100%.

Event detection analysis 300 has an identified event 310 of hole cleaning. Identified event 310 has two categories 312 in this example, drilling parameters and hydraulic data with drilling parameters. The drilling parameters category has a weighting of 40% and the hydraulic data with drilling parameters has a weighting of 60% (i.e., % Category Values 314). Each category has an event parameter 320 with an associated event parameter weighting 322. Equation 1 demonstrates an example analysis for the hole cleaning event.

Equation 1: Example hole cleaning analysis $$\text{Hole Cleaning Event rating} = \text{Drilling parameter rating} \ast 0.4 + \text{Hydraulics with drilling parameters rating} \ast 0.6$$

where: 0<=Hole Cleaning Event rating <=1.

Figure 4:
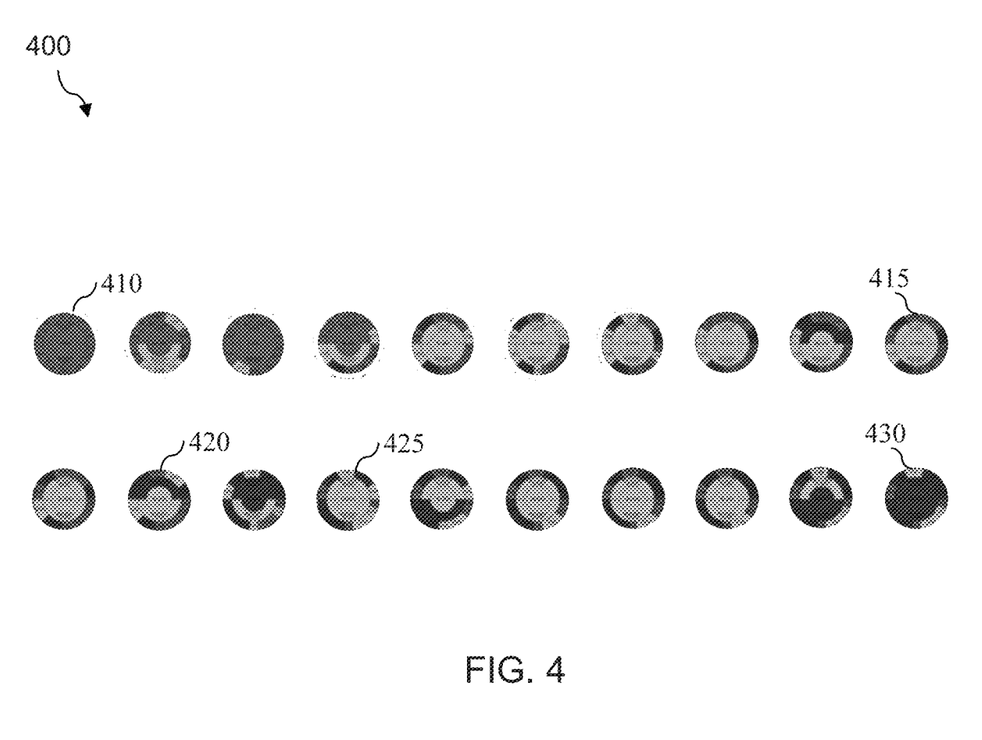
FIG. 4 is an illustration of diagrams of example range of results that can be determined using the analysis of FIG. 3.

FIG. 4 is an illustration of diagrams of example range of results 400 that can be determined using the analysis. The results of the analysis, such as shown in FIG. 3, can be visualized as a changing graph. For example, result 410 shows that the results are non-critical for every parameter analyzed. The size of each section of each result can indicate the rough percentage of weighting that parameter has on the overall analysis. Shading can be used to indicate that a parameter has moved from non-critical to warning, and then to critical. Result 415 indicates that the analysis of the parameters resulted in an event detection potential of 0.5. This can indicate that a warning alert should be communicated to a user or a system so that correction action can be taken on subsequent drilling operations.

Result 420 indicates that the analysis of the parameters result in an event detection potential, which can be deemed an elevated warning for notification. Result 425 indicates that the analysis of the parameters result in an even detection potential of 0.6, which can be deemed a critical level for immediate notification or automated corrective action. Result 430 indicates that the analysis of the parameters result in an event detection potential that is very high and very critical to the operations at the borehole.

The various alert notification levels can be specified by a user, such as a potential warning value, a potential critical value, or other values. The weighting of each event parameter can be specified as an event parameter weighting parameter. The category weighting can be specified as a category weighting parameter. The systems or users to be alerted when a notification is sent can be specified as a notification parameter. These parameters can be specified as user parameters.

In an implementation, all of the results shown in result 400 are not generated, the results are generated for the specific set of received input parameters. Results 400 is an example of several types of results that could be generated.

In some aspects, an ongoing calculation of a first derivative of each component of the event analysis can be used for n number of recent calculations with respect to time, where M is the number of drilling parameters. Equation 2 is an example derivative calculation where z represents a specific time.

Example derivative calculation $$\left[\frac{d(\text{Drilling parameter})}{dt}\right]_M \cong \frac{\sum_{z=1}^{n} \frac{(\text{Drilling Parameter}_M)_z - (\text{Drilling Parameter}_M)_{z-1}}{t_z - t_{z-1}}}{n} \quad \text{Equation 2}$$

Equation 3 demonstrates a similar calculation can be performed for each of the event probability models versus drilling parameters with k representing the number of model versus drilling parameters.

Example model versus drilling parameters calculation $$\left[\frac{d(\text{Model vs Drilling parameter})}{dt}\right]_k \cong \frac{\sum_{z=1}^{n} \frac{(\text{Model vs Drilling Parameter}_k)_z - (\text{Model vs Drilling Parameter}_k)_{z-1}}{t_z - t_{z-1}}}{n} \quad \text{Equation 3}$$

The derivatives of each of the components of the model can be used for approximating the potential (e.g., probability) of an event occurring at a future point in time. An assumption can be made that the current calculated trends will continue. The future potential can be computed using a linear approximation, as demonstrated in Equation 4.

Example future potential estimation using a linear approximation $$\text{Future Rating} \cong \left[\sum_{M=1}^{6}\left(\frac{d(\text{Drilling parameter})}{dt}\right)_M * T * 0.4\right] + \left[\sum_{k=1}^{5}\left(\frac{d(\text{Model vs Drilling parameter})}{dt}\right)_k\right] * T * 0.6 \quad \text{Equation 4}$$

where T is the future time minus the current time.

In some aspects, events can utilize more than two categories, with the relative category values apportioned by user parameters. Each category can utilize its own set of parameter inputs to make the computation.

In some aspects, a more complex set of derivative responses can be used when the input parameters for each category do not follow an approximate linear response. In aspects, the set of time z responses can be fit to non-linear functions to account for these situations. In these aspects, the curve fitted responses can be used to predict future conditions in combination with the linear approximations.

Figure 5:
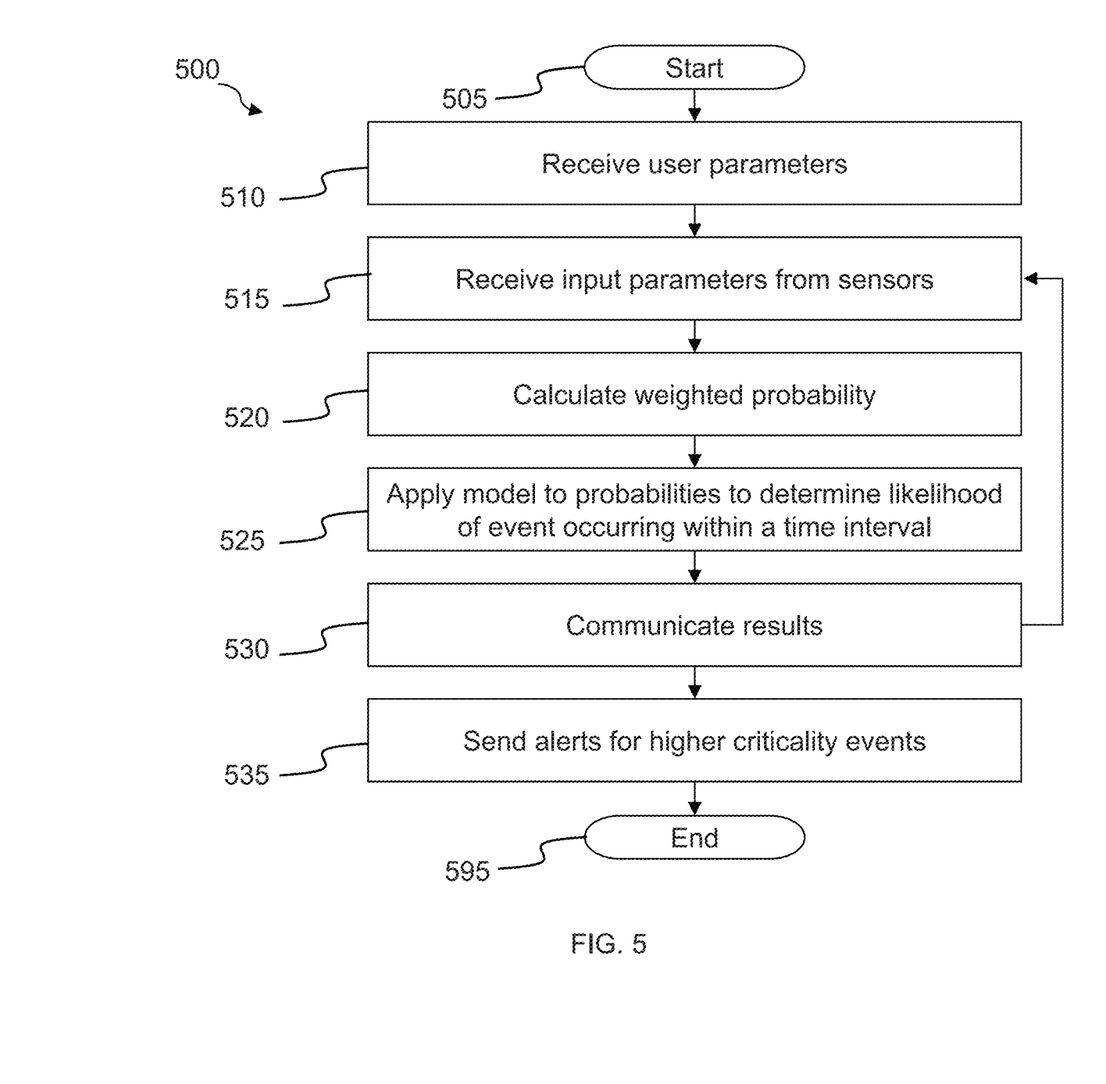
FIG. 5 is an illustration of a flow diagram of an example method to demonstrate event detection analyzation.

FIG. 5 is an illustration of a flow diagram of an example method 500 to demonstrate event detection analyzation of various drilling parameters, subterranean formation parameters, equipment parameters, and surface parameters for a drilling operation. Method 500 can be performed on a computing system, for example, event detection analyzer system 600 of FIG. 6 or event detection analyzer controller 700 of FIG. 7. The computing system can be a well site controller, a geo-steering system, a reservoir controller, a data center, a cloud environment, a server, a laptop, a mobile device, smartphone, PDA, or other computing system capable of receiving the acoustic data, input parameters, and capable of communicating with other computing systems. Method 500 can be encapsulated in software code or in hardware, for example, an application, code library, dynamic link library, module, function, RAM, ROM, and other software and hardware implementations. The software can be stored in a file, database, or other computing system storage mechanism. Method 500 can be partially implemented in software and partially in hardware. Method 500 can perform the steps for the described processes, for example, determining the potential for an event using a weighted analysis of data collected from more than one type of sensor.

Method 500 starts at a step 505 and proceeds to a step 510. In step 510, user parameters can be received. The user parameters can specify what sensor data is being used (such as downhole sensors, surface sensors, fluid sensors, drill rig sensors, or other types of sensors). The user parameters can specify what events are being considered for computing the potential event detection. The user parameters can specify the weighting given to each category of an event, to the weighting given to each event parameter that is used for each category, and the weight given to various trend changes, where an x to $x_1$% change in a trend can be weighted higher than a y to $y_1$% change in the trend.

The user parameters can specify a time interval for collecting data which can be used to determine trends, where the trends are used as inputs into determining the potential for an event. The user parameters can specify the warning and critical thresholds used for determining whether an alert notification is communicated to a user or other system. The user parameters can specify the event probability model or machine learning system that can be used with the sensor parameters to determine the likelihood of an event occurring given the input parameters. These user parameters can be provided at various times. Typically, the user parameters are received at the start of a drilling stage and will continue to be used for each execution of the remaining steps for that drilling stage. In some aspects, the user parameters can be updated at a point within the drilling stage.

In a step 515, input parameters can be received from one or more sensors of the borehole or drilling system. Parameters can be received from downhole sensors, such as resistivity sensors, acoustic sensors, nuclear sensors, radioactive sensors, magnetic sensors, sensors for the drill assembly, or other downhole sensors. Parameters can be received from uphole or surface sensors, such as rig sensors, drill pipe sensors, return fluid line sensors, cuttings sensors, gravitational sensors, or other surface sensors. The collected sensor data can be communicated to the event detection analyzer (e.g., event detection processor), as the input parameters.

In a step 520, the weighted probability can be calculated for the one or more events being tracked by the process. The weighted probability is based on the input parameters and the weighted input parameters. The weighted probability can use the time interval for collecting data over time to determine trends of how the input parameters change overtime. In some aspects, certain trends can be given different weighting from other trends. For example, for a specific sensor data collected, a small change over time can indicate a smaller weighting than a larger change over the same time interval.

In a step 525, event probability models or machine learning systems can be applied to the weighting results from step 520 to determine the probability of an event occurring within a drilling distance interval or within a time period. Using previous learnings, a certain trend in data collected from a sensor can indicate an increased likelihood of the event occurring, for example, a higher potential that a stuck drill string will occur.

In a step 530, the results can be communicated to a user or other systems for analyzation or processing. For example, if the trend indicates a high likelihood of a stuck drill string (where high is a threshold defined by the user parameters), this information can be used by the drilling operations to adjust the operations to reduce the chance of that event occurring, such as implementing corrective action. Method 500 can loop back to step 515 to receive a new set of input parameters. The loop back can be in real-time, near real-time, or at a time interval specified in the user parameters. The loopback can continue until an end state condition occurs, such as being stopped by a user or the operations for a drilling stage ends.

Whether or not method 500 loop backs to step 515, method 500 can proceed to a step 535. In step 535, if the probability of an event occurring meets a specified threshold for alerting (e.g., a critical alert threshold), an alert notification can be sent out to one or more users or systems to alert them that an event occurrence is critical or likely to occur and corrective action should be taken as quickly as possible. For example, if the process determines that a casing failure is likely to occur, an alert can be sent out so corrective action can be implemented prior to the casing failure occurring. Method 500 ends at a step 595.

Figure 6:
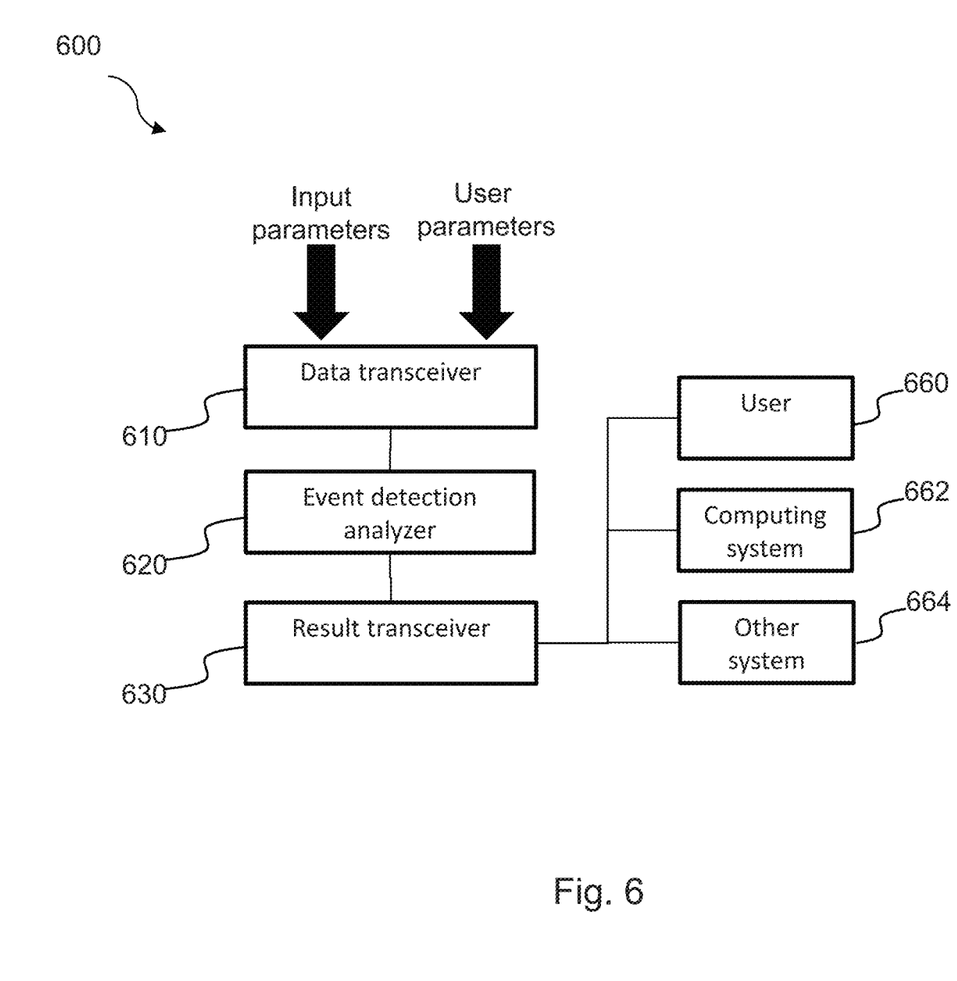
FIG. 6 is an illustration of a block diagram of an example event detection analyzer system.

FIG. 6 is an illustration of a block diagram of an example event detection analyzer system 600, which can be implemented in one or more computing systems, for example, a data center, cloud environment, server, laptop, smartphone, tablet, and other computing systems. In some aspects, event detection analyzer system 600 can be implemented using an event detection analyzer controller such as event detection analyzer controller 700 of FIG. 7. Event detection analyzer system 600 can implement one or more methods of this disclosure, such as method 500 of FIG. 5.

Event detection analyzer system 600, or a portion thereof, can be implemented as an application, a code library, a dynamic link library, a function, a module, other software implementation, or combinations thereof. In some aspects, event detection analyzer system 600 can be implemented in hardware, such as a ROM, a graphics processing unit, or other hardware implementation. In some aspects, event detection analyzer system 600 can be implemented partially as a software application and partially as a hardware implementation. Event detection analyzer system 600 is a functional view of the disclosed processes and an implementation can combine or separate the described functions in one or more software or hardware systems.

Event detection analyzer system 600 includes a data transceiver 610, an event detection analyzer 620, and a result transceiver 630. The results, (e.g., the input parameters, potential for an event to occur), analysis, and interim outputs from event detection analyzer 620 can be communicated to a data receiver, such as one or more of a user or user system 660, a computing system 662, or other processing or storage systems 664. Computing system 662 can be a well site controller, a drilling controller, a BHA, a drilling assembly, or other surface or downhole controller. The results can be used to determine the directions provided to a drilling system or used as inputs into a well site controller or other borehole system, such as a drilling operation planning system.

Data transceiver 610 can receive input parameters, such as user parameters to direct the operation of the analysis implemented by event detection analyzer 620, such as algorithms to utilize in determining the results, a weighting factor for each type of parameter collected, estimated characteristics of the subterranean formation (e.g., type of rock), or other input parameters. In some aspects, data transceiver 610 can be part of event detection analyzer 620.

Result transceiver 630 can communicate one or more results, analysis, or interim outputs, to one or more data receivers, such as user or user system 660, computing system 662, storage system 664, e.g., a data store or database, or other related systems, whether located proximate result transceiver 630 or distant from result transceiver 630. Data transceiver 610, event detection analyzer 620, and result transceiver 630 can be, or can include, conventional interfaces configured for transmitting and receiving data. In some aspects, event detection analyzer 620 can be a machine learning system, such as to apply previously learned event probability models to the current input parameters to improve the determination of the potential for an event to occur.

Figure 7:
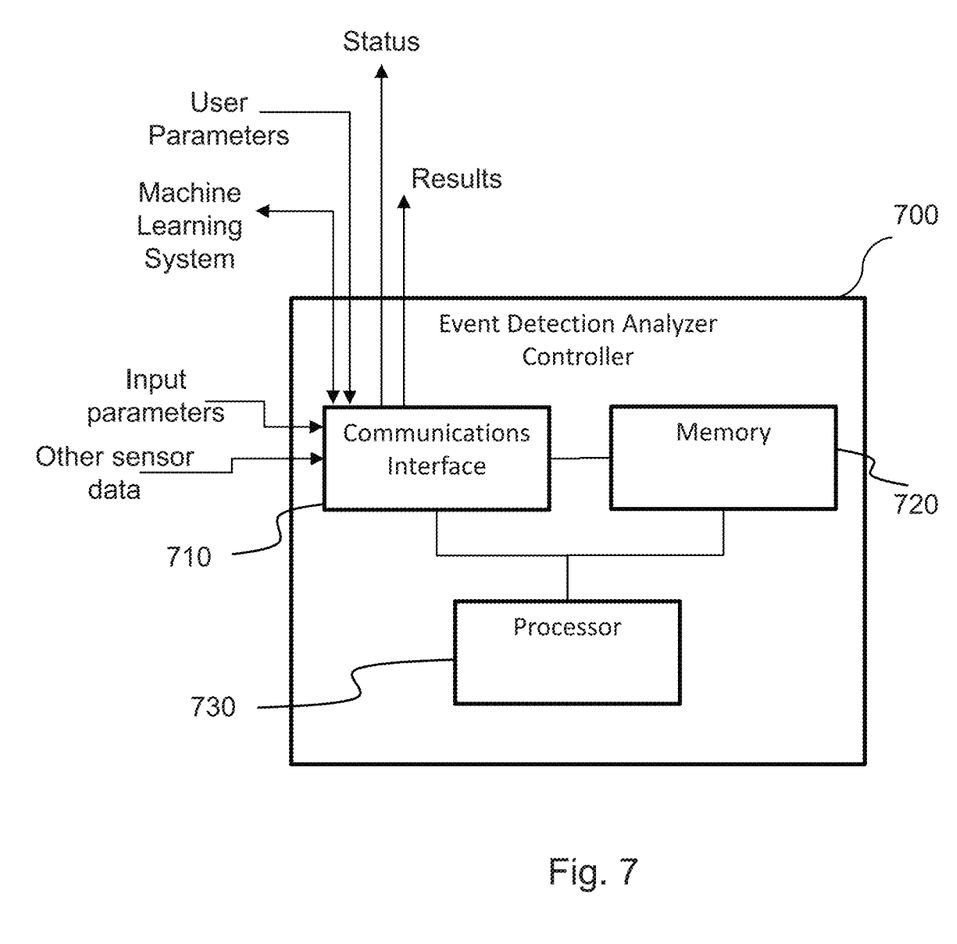
FIG. 7 is an illustration of a block diagram of an example of an event detection analyzer controller according to the principles of the disclosure.

Event detection analyzer 620 (e.g., an event detection analyzer processor such as processor 730 of FIG. 7) can implement the analysis and algorithms as described herein utilizing the acoustic data, the input parameters, and other collected measurements. For example, event detection analyzer 620 can analyze the input parameters an determine a potential (e.g., a probability) that an event would occur, and alert or notify users or other systems if the criticality exceeds a threshold for such reporting. Event detection analyzer 620 can be implemented in a well site controller, a drilling controller, or other surface controller or downhole controller.

A memory or data storage of event detection analyzer 620 can be configured to store the processes and algorithms for directing the operation of event detection analyzer 620. Event detection analyzer 620 can also include a processor that is configured to operate according to the analysis operations and algorithms disclosed herein, and an interface to communicate (transmit and receive) data.

FIG. 7 is an illustration of a block diagram of an example of an event detection analyzer controller 700 according to the principles of the disclosure. Event detection analyzer controller 700 can be stored on a single computer or on multiple computers. The various components of event detection analyzer controller 700 can communicate via wireless or wired conventional connections. A portion or a whole of event detection analyzer controller 700 can be located at one or more locations and other portions of event detection analyzer controller 700 can be located on a computing device or devices located at a surface location. In some aspects, event detection analyzer controller 700 can be wholly located at a surface or distant location. In some aspects, event detection analyzer controller 700 can be part of another system, and can be integrated in a single device, such as a part of a drilling operation planning system, a well site controller, or other borehole system.

Event detection analyzer controller 700 can be configured to perform the various functions disclosed herein including receiving input parameters, user parameters, and other sensor measurements or geological survey data, and generating results from an execution of the methods and processes described herein, such as determining a potential for one or more events of occurring, and other results and analysis. Event detection analyzer controller 700 includes a communications interface 710, a memory 720, and a processor 730.

Communications interface 710 is configured to transmit and receive data. For example, communications interface 710 can receive the input parameters, user parameters, and other collected sensor measurements or geological survey data. Communications interface 710 can transmit the results, data from the input files, or interim outputs. In some aspects, communications interface 710 can transmit a status, such as a success or failure indicator of event detection analyzer controller 700 regarding receiving the various inputs, transmitting the generated results, or producing the results.

In some aspects, communications interface 710 can receive input parameters from a machine learning system, for example, where the machine learning system can apply learned event probability models to improve the accuracy of the event potential, or to apply a weighting system to the collected input parameters.

In some aspects, the machine learning system can be implemented by processor 730 and perform the operations as described by event detection analyzer 620. Communications interface 710 can communicate via communication systems used in the industry. For example, wireless or wired protocols can be used. Communication interface 710 is capable of performing the operations as described for data transceiver 610 and result transceiver 630 of FIG. 6.

Memory 720 can be configured to store a series of operating instructions that direct the operation of processor 730 when initiated, including the code representing the algorithms for determining processing the collected data. Memory 720 is a non-transitory computer readable medium. Multiple types of memory can be used for data storage and memory 720 can be distributed.

Processor 730 can be configured to produce the results (e.g., determining the potential for an event occurring, and other results), one or more interim outputs, and statuses utilizing the received inputs. Processor 730 can be configured to direct the operation of event detection analyzer controller 700. Processor 730 includes the logic to communicate with communications interface 710 and memory 720, and perform the functions described herein. Processor 730 is capable of performing or directing the operations as described by event detection analyzer 620 of FIG. 6.

Various figures and descriptions can demonstrate a visual display of the input parameters and the resulting analysis of the input parameters. In some aspects, the visual display can be utilized by a user to determine the next steps of the analysis. In some aspects, the visual display does not need to be generated, and a system, such as a machine learning system, can perform the analysis using the input parameters. In some aspects, a visual display and a machine learning system can be utilized. In some aspects, the input parameters or partially analyzed input parameters can be transmitted to one or more surface computing systems or downhole computing systems, such as a well site controller, a computing system, or other processing system. The surface system or downhole system can perform the analysis and can communicate the results to one or more other systems, such as a well site controller, a well site operation planner, a geosteering system, or another borehole system.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Configured or configured to means, for example, designed, constructed, or programmed, with the necessary logic and/or features for performing a task or tasks.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the SUMMARY can have one or more of the following additional elements in combination. Element 1: communicating, using a result transceiver, the results to a drilling operation planning system, a well site controller, a surface controller, or a user. Element 2: alerting a user or system to the event where the potential for the event to occur exceeds a critical alert threshold. Element 3: wherein a system directing the drilling operation receives the results and utilizes the results to direct a corrective action to the drilling operation. Element 4: wherein the one or more sensors are located downhole the borehole or at a surface of the borehole. Element 5: wherein the applying is performed by a machine learning system. Element 6: wherein the event is a first event, and the calculating, and applying utilize one or more additional events. Element 7: wherein the receiving the input parameters, the calculating the weighted probability, and the applying the event probability model are repeated at a specified time interval, where the input parameters are updated at the time interval. Element 8: wherein the results include a set of event parameters for each category of the event, and each event parameter in the set of event parameters is associated with a respective weighted probability. Element 9: a result transceiver, capable of communicating the results to a surface controller or a downhole controller. Element 10: wherein the surface controller is a well site controller, a drilling controller, or an operations system. Element 11: wherein the one or more processors utilize a machine learning system to apply the event probability model to the input parameters. Element 12: wherein the machine learning system is trained using input data received from the borehole, from one or more other boreholes, or from lab testing. Element 13: wherein the one or more processors are part of a well site controller or a drilling controller.

What is claimed is:

1. A method, comprising:
   receiving user parameters and input parameters at a processor, wherein the input parameters are received from one or more sensors located at a borehole undergoing a drilling operation;
   calculating a weighted probability for each event parameter of a drilling operation event as indicated in the input parameters, where the weighted probability includes a trend of the event parameter over a time interval, and a weighting for the weighted probability is specified in the user parameters;
   applying hydraulic data and an event probability model to the weighted probability for each respective event parameter using a first derivative calculation of the event probability model versus a corresponding drilling parameter derived over the time interval, wherein the event probability model is a previously learned data model to provide a comparison or a weighting to the weighted probability for each event parameter;
   generating results, using the processor, by using the weighted probability, as modified in the applying step, for each respective event parameter and the trend wherein the results determine a potential for the drilling operation event to occur and an estimated time period for the drilling operation event to occur; and
   altering, using the results, rotations per minute, rate of penetration, or drill string torque of a drilling assembly thereby reducing the potential for the drilling operation event to occur over the estimated time period.

2. The method as recited in claim 1, wherein the drilling assembly includes a drill bit and the altering changes the operation of the drill bit.

3. The method as recited in claim 1, further comprising:
   alerting a user or system to the event where the potential for the event to occur exceeds a critical alert threshold.

4. The method as recited in claim 1, further comprising altering, using a drilling controller and the results, the drilling operation by implementing a corrective action of adjusting one or more of a drilling parameter, a well characteristic parameter, an operational timing, a drilling fluid parameter, or a solid control equipment operational parameter.

5. The method as recited in claim 1, wherein the one or more sensors are located downhole the borehole or at a surface of the borehole.

6. The method as recited in claim 1, wherein the applying is performed by a machine learning system.

7. The method as recited in claim 1, wherein the drilling operation event is a first drilling operation event, and the calculating the weighted probability, the generating the modified weighted probability, and the generating results utilize one or more additional drilling operation events.

8. The method as recited in claim 1, wherein the receiving the input parameters, the calculating the weighted probability, and the applying hydraulic data and the event probability model are repeated at a specified time interval, where the input parameters are updated at the time interval.

9. The method as recited in claim 1, wherein the results include a set of event parameters for each category of the event, and each event parameter in the set of event parameters is associated with a respective weighted probability.

10. A system, comprising:
    a data receiver, capable to receive input parameters and user parameters, wherein the input parameters are received from one or more downhole sensors located downhole a borehole undergoing a drilling operation or one or more surface sensors located proximate the borehole at a surface of the borehole; and
    one or more processors, capable to communicate with the data receiver, and analyze the input parameters using the user parameters to generate results by computing, using the input parameters, a weighted potential for one or more drilling operation events to occur, determining a likelihood of the one or more drilling operation events to occur within a specified time interval of a parameter of the results by applying hydraulic data and an event probability model using a first derivative calculation of the event probability model versus a corresponding drilling parameter derived over the specified time interval, and altering, using the results, a mud weight parameter, a mud rheology parameter, or a mud chemistry parameter of a drilling fluid through directing a surface controller thereby reducing the potential for the drilling operation event to occur over the estimated time interval, wherein the event probability model is a previously learned data model to provide a comparison or a weighting to the weighted potential for each event parameter of the one or more drilling operation events.

11. The system as recited in claim 10, further comprising:
    a result transceiver, capable of communicating the results to the surface controller or the downhole controller.

12. The system as recited in claim 11, wherein the surface controller is a well site controller, a drilling controller, or an operations system.

13. The system as recited in claim 10, wherein the one or more processors utilize a machine learning system to apply the event probability model to the input parameters.

14. The system as recited in claim 13, wherein the machine learning system is trained using input data received from the borehole, from one or more other boreholes, or from lab testing.

15. The system as recited in claim 10, wherein the one or more processors are part of a well site controller or a drilling controller.

16. A computer program product having a series of operating instructions stored on a non-transitory computer-readable medium that directs a data processing apparatus when executed thereby to perform operations to analyze input parameters from one or more sensors of a borehole undergoing a drilling operation, the operations comprising:
    receiving user parameters and the input parameters, wherein the input parameters are received from the one or more sensors;
    calculating a weighted probability for each event parameter of a drilling operation event as indicated in the input parameters, where the weighted probability includes a trend of the event parameter over a time interval, and a weighting for the weighted probability is specified in the user parameters;

applying hydraulic data and an event probability model to the weighted probability for each respective event parameter using a first derivative calculation of the event probability model versus a corresponding drilling parameter derived over the time interval, wherein the event probability model is a previously learned data model to provide a comparison or a weighting to the weighted probability for each event parameter;

generating results, using the processor, by using the weighted probability, as modified in the applying step, for each respective event parameter and the trend, wherein the results determine a potential for the drilling operation event to occur and an estimated time period for the drilling operation event to occur; and directing a solid control equipment to alter, using the results, a shale shaker parameter, a de-silter parameter, a cuttings auger parameter, a swarf removal parameter, or a dewatering parameter thereby reducing the potential for the drilling operation event to occur over the estimated time period.

17. The computer program product as recited in claim 16, further comprising:
   communicating, using a result transceiver, the results to a drilling operation planning system, a surface controller, or a user.

18. The computer program product as recited in claim 16, further comprising:
   alerting a user or system to the event where the potential for the event to occur exceeds a critical alert threshold.

19. The computer program product as recited in claim 16, wherein the calculating the weighted probability and the generating a modified weighted probability utilize one or more processors, and the one or more processors utilize a machine learning process to apply the input parameters to one or more event probability models to determine the potential for the event to occur.

20. The computer program product as recited in claim 16, wherein the operations are repeated in real-time, near real-time, or at a specified drilling distance interval or time interval.

* * * * *